(No Model.)
W. I. TINKHAM.
CATTLE CAR.
No. 247,968. Patented Oct. 4, 1881.
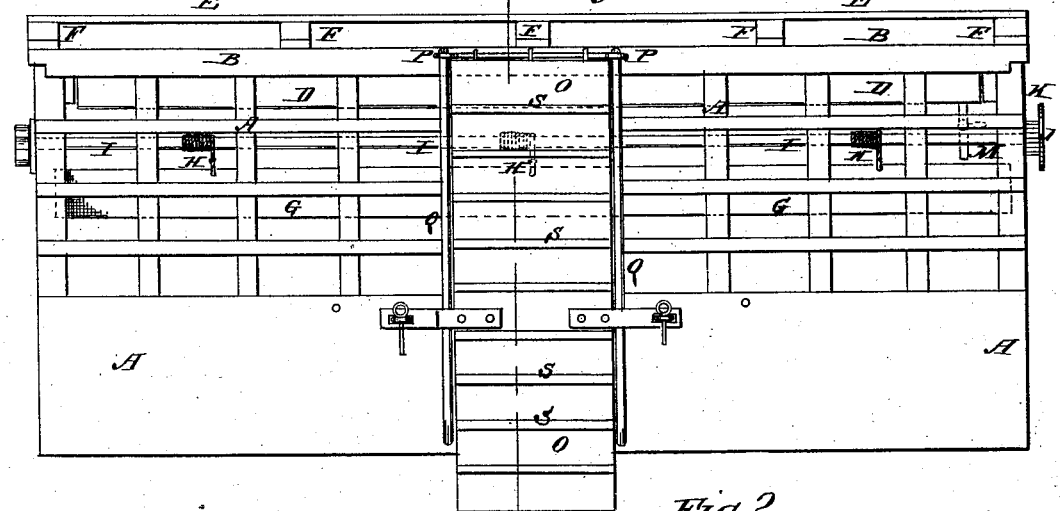
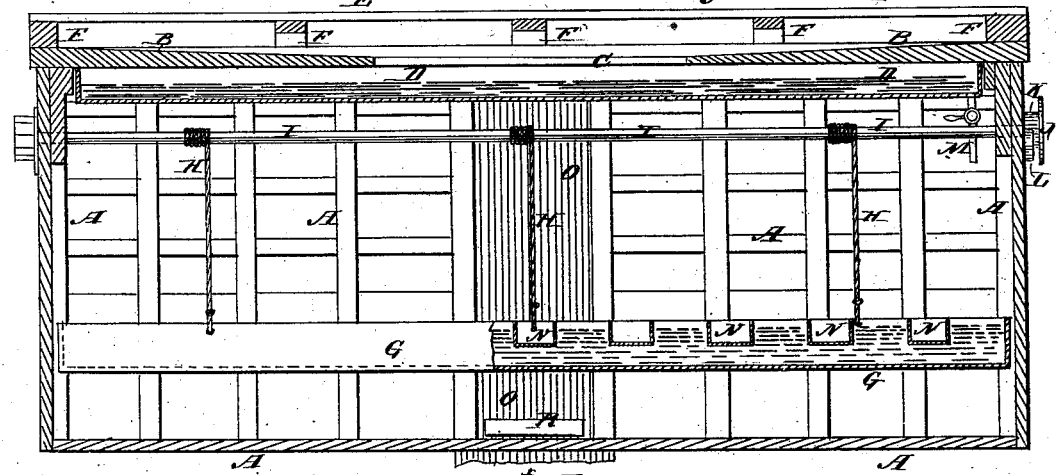
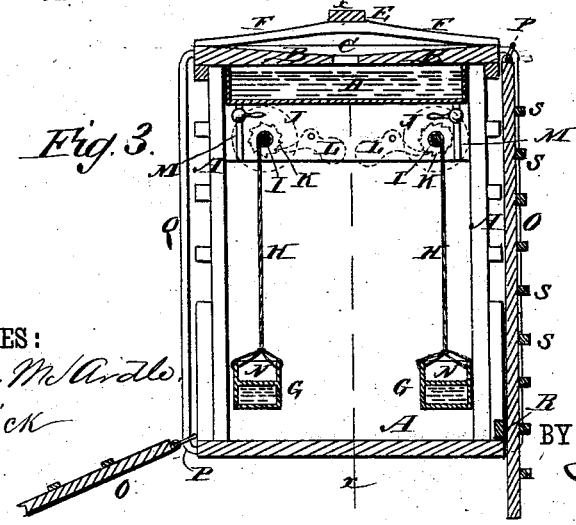
WITNESSES:
Francis McArdle
C. Sedgwick
INVENTOR:
W. I. Tinkham
BY Munn & Co
ATTORNEYS.

UNITED STATES PATENT OFFICE.

WALTER I. TINKHAM, OF TAUNTON, MASSACHUSETTS.

CATTLE-CAR.

SPECIFICATION forming part of Letters Patent No. 247,968, dated October 4, 1881.

Application filed July 23, 1881. (No model.)

*To all whom it may concern:*

Be it known that I, WALTER IRVING TINKHAM, of Taunton, in the county of Bristol and State of Massachusetts, have invented a new and useful Improvement in Cattle-Cars, of which the following is a full, clear, and exact description.

In the accompanying drawings, Figure 1 is a side elevation of my improvement. Fig. 2 is a sectional side elevation of the same, taken through the line $x$ $x$, Fig. 3. Fig. 3 is a sectional end elevation of the same, taken through the line $y$ $y$, Fig. 1.

Similar letters of reference indicate corresponding parts.

The object of this invention is to facilitate the loading, unloading, feeding, and watering of cattle and other animals while being transported.

In the drawings, A represents the body of the car, which is constructed in the ordinary manner. The roof B of the car-body A is made hopper-shaped, or inclines from its sides and ends toward a longitudinal slot, C, formed in its middle part.

In the upper part of the car-body A and directly beneath the roof B is formed a tank, D, to contain water for the cattle or other animals being carried in the car. The slot C does not extend quite to the ends of the car, the end parts of the roof being left solid to prevent the water in the tank D from spattering out. The slot C is covered and protected by a board, E, placed over it and secured to bars or blocks F, attached to the roof B. The hopper shape of the roof causes all the rain that falls upon it to flow into the tank D, and also allows water to be conveniently poured into the said tank.

At the sides of the car-body A, beneath the side parts of the tank D, are placed long troughs G, to which are attached the lower ends of a number of chains, H. The upper ends of the chains H are attached to shafts I, which extend along the upper part of the sides of the car-body A and work in bearings in the ends of the said car-body. By this construction the troughs G can be raised to receive water from the tank D, and to keep the said troughs, when not in use, out of the way of the animals in the car by turning the shafts I. The ends of the shafts I project at one or both ends of the car, and have hand wheels or cranks J attached to them, by means of which the said shafts are turned to raise and lower the troughs G.

To the ends of the shafts I are also attached ratchet-wheels K, with the teeth of which engage the pawls L, to hold the troughs G securely in any position into which they may be raised or lowered. The outer ends of the pawls L are made heavy to hold the engaging ends of the said pawls against the teeth of the ratchet-wheels K.

When the troughs are to be lowered the pawls L can be turned so that their weighted ends will rest upon the ratchet-wheels K, and thus allow the shafts I to be turned freely.

The end parts of the tank D are provided with faucets M, so that water can be readily drawn from the said tank into the troughs G.

Within the troughs G are secured a number of small boxes, N, to receive feed for the animals, and which do not extend quite to the bottoms of the said troughs, so that the water can flow past them freely. The feed-boxes N also prevent the water in the troughs G from spattering out. In case the feed-boxes N be not used the troughs G should be provided with cross-partitions to strengthen them and prevent the water from spattering out, which partition should not extend quite to the bottoms of the said troughs G, so that the water will flow past them freely.

O are the doors of the car, which have eyes P attached to their upper corners, to receive and slide upon the upright rods Q, attached at their ends to the sides of the car-body A. The ends of the rods Q are bent inward to raise the bodies of the said rods away from the said sides of the car-body to allow the eyes P to slide upon them freely. The doors O are supported when raised into place by cross-bars R, attached to their inner sides, and which rest upon the door-sills. The doors O are secured in place when raised by hasps, staples, and pins, as shown in Fig. 1, or by other suitable fastenings. The doors O are made strong and heavy, are made longer than the height of the car-body, and have cross-cleats S attached to their outer sides to adapt them, when lowered, to serve as gang-planks for the animals to walk upon when entering or leaving the car, so that the cars can be loaded and unloaded wherever they may stop.

Having thus described my invention, I claim as new and desire to secure by Letters Patent—

1. In a cattle-car, the combination, with the car-body A, having its roof B slotted longitudinally through its middle part and inclined from its sides and ends toward the said slot, of the tank D, substantially as herein shown and described, whereby water for the cattle can be received and carried, as set forth.

2. In a cattle-car, the combination, with the car-body A, of the door O, having eyes P attached to its upper corners, a cross-bar, R, attached to its inner side, and cross-cleats S to its outer side, and the upright rods, Q, substantially as herein shown and described, whereby the said door can also be used as a gang-plank, as set forth.

WALTER IRVING TINKHAM.

Witnesses:
HENRY N. HOPKINS,
E. D. GODFREY.